July 3, 1956          J. L. KIMBALL          2,753,118
HOT AND COLD WATER MIXING CONTROL
Filed June 25, 1952
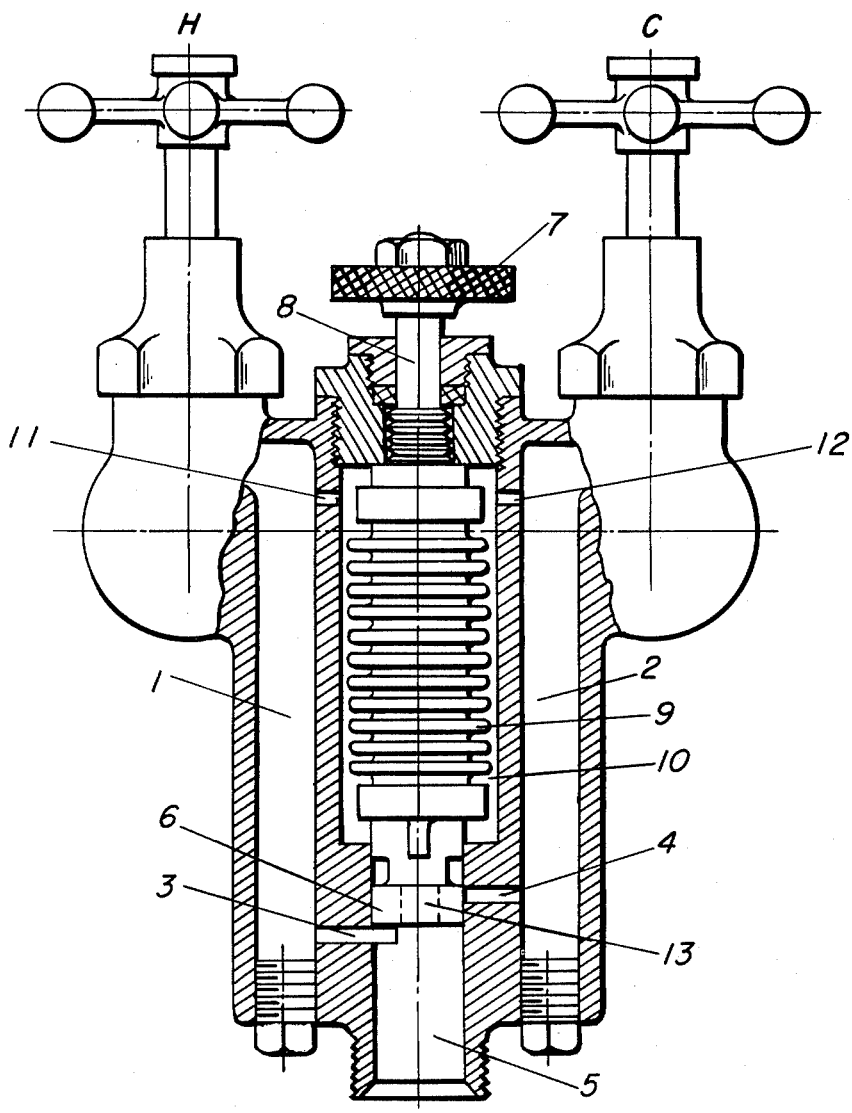

2,753,118

HOT AND COLD WATER MIXING CONTROL

James L. Kimball, Danvers, Mass.

Application June 25, 1952, Serial No. 295,432

3 Claims. (Cl. 236—12)

My invention relates to the regulation of temperature of fluids and more particularly, though not exclusively, to the regulation of two fluid streams of different temperatures to maintain a substantially uniform temperature in a common delivery outlet, as for example, hot and cold water mixing control for bathing in the home or in hospitals and like institutions where sick or mental cases are treated.

The principal object of my invention is to avoid oscillatory control in the mixing of two fluids of different temperatures. A further object is to provide control apparatus having definite temperature control limits.

In cases where the control of the hot water is available to children or to patients in hospitals or other like institutions then there is danger of injury by scalding with water of high temperatures. My invention avoids this risk by first avoiding oscillatory control and secondly by placing a definite control limit on the upper temperatures.

In hot and cold water mixing control the hot water is much hotter than required for normal use, furthermore the temperature may vary widely, consequently it is not a safe practice to draw water of alternate hot and cold quantities, or to have no limit of control over the temperature.

With this understanding applicant has devised a novel means for sampling the average temperature of the two fluid streams and from the result of this sampling operation, control the relative flow of the hot and cold water in accordance with the required temperature.

Another novel feature of the invention is the interposing of the thermostatic element between the control valve and the manual control means whereby either can change the relation of the flow valve to vary the respective flows of the hot and cold water.

Referring to the drawing H is the hot water supply valve and C the cold water supply valve. The two component streams of hot and cold water flow downward through channels 1 and 2 thence through apertures 3 and 4 to a common delivery outlet 5. The respective flows through apertures 3 and 4 is governed by flow valve 6. A manual positioning control 7 has a screw adjustment stem 8. Interposed between 8 and valve 6, and operatively attached to both, is a thermostatic element 9. This thermostatic element is located between the hot and cold water channels 1 and 2 in what will be referred to as a sampling chamber 10. At the upper end of this chamber ports 11 and 12 connect respectively to the hot and cold water channels 1 and 2. While the drawing shows these ports 11 and 12 as being on the line of cross section, in practice these ports are drilled at an angle in such a way as to give a swirling motion to the hot and cold water, in the same direction, and thereby more uniformly obtain an average temperature of the two streams within the sampling chamber.

When the hot and cold water is turned on, the pressures being the same, equal amounts of hot and cold water enter the sampling chamber, this mixes and flows downward around thermostat 9 passing the guide webs formed at the upper end of valve 6 to the common outlet 5 through orifice 13 in valve 6 as shown in dotted lines, which also acts as the delivery port for cold water flow from aperture 4. Orifice 13 should be of sufficient size to pass the full flow from channel 2 including that from parts 11 and 12, while a single orifice is indicated in drawing, a series of drilled holes may be employed if found more convenient.

In the operation of my invention if the outgoing water is not of the required temperature then a manual adjustment of valve 6 is made to bring this about, thereafter should the temperature change in either the hot or cold water supply entering the sampling chamber the flow control valve 6 will be thermostatically regulated to vary the relative flows to maintain the outgoing water at the original set temperature.

In my invention a relatively sensitive thermostat is made possible by its location in a sampling chamber, independent of abrupt changes in the principal flowing quantities, thus permitting of a relatively narrow range of temperature control. After being adjusted for the required temperature the thermostat makes the necessary corrections by slightly closing one of the apertures and opening the other as the change may require.

Either of these apertures should be capable of passing the entire volume requirements meaning that when the control valve is in a neutral position there will be substantially equal flow from each of the two apertures. In the interest of sensitivity the apertures should be relatively narrow, this minimizes the required movement of the thermostat for a full flow in either of two directions.

It is preferable to keep ports 11 and 12 relatively small as a slow flow through the sampling chamber gives a better mixing operation, also more time for the thermostat to absorb and radiate the heat change, thereby avoiding over-correction in the control of the two main streams.

It should be understood that the control valve 6 must be manually positioned for the required temperature, thereafter the thermostat takes over and makes corrections for any variation in temperature of the two main streams of hot and cold water.

Applicant's invention avoids sudden changes of hot and cold and consequent over correction thereby permitting of stabilized control at near the point of ultimate sensitivity.

In my invention time lag can not act as a sustaining factor in causing oscillatory control, as the response lag in one direction has no influence in causing an over correction in the opposite direction. Oscillations of a constant magnitude are sustained by response lag of the controlling means causing an over correction in first one and then the other flowing quantities. In this way the lag is intermittent first in one direction and then in the other. In my invention the flow is not reversed within the sampling chamber and consequently there are no wide variations in the absorption and radiation of heat within the thermostat and adjustments are only such as are due to the variations of the temperature of the incoming water.

From the foregoing it will be seen that in the conventional mixing valve control it is the inability of the thermostat to follow abrupt changes in the flowing quantities which start the hunting cycle, and once started, the same lack of instantaneous response sustains the oscillation. In applicant's invention the thermostat is not subject to any abrupt changes consequently over corrections are held to a minimum. It will now be seen by those skilled in the art that I have invented novel control means for apportioning the respective flows of fluids of different temperatures to maintain a combined flow of a substantial uniform temperature. While my invention has been described in connection with a specific embodiment, it is

I claim:

1. In a hot and cold water mixing control, comprising in combination, a cylindrical chamber, channels on opposite sides thereof for passing water at different temperatures, apertures connecting said channels with said chamber, said apertures consisting of narrow passages longitudinally arranged in parallel spaced relation, a piston valve, having an opening therethrough adapted to regulate the flow of said two streams through said apertures, said valve having a relatively neutral position in which substantially equal quantities of water of different temperatures flows to a common outlet, and other flow positions in which varying quantities of water of different temperatures flow to said outlet, ports including continuous fixed openings of equal size connecting the delivery channels with said chamber at the up stream side of said apertures by means of which uniform quantities of hot and cold water are mixed and flows to the common outlet, thermostatic means responsive to variations in the average temperature within said chamber for operating said valve and manual means for positioning said valve in relation to said apertures for initially apportioning said two streams.

2. In a hot and cold water mixing control, in combination, a sampling chamber, hot and cold water flow channels on opposite sides thereof, apertures through which said hot and cold water flows to a common down stream outlet, said apertures consisting of narrow passages longitudinally arranged in spaced relation, a piston valve including an opening therethrough for the passage of water from said chamber, said valve having a relatively neutral position in which substantially equal quantities of hot and cold water flows to the common down stream outlet and other flow positions in which varying quantities of hot and cold water flows to said outlet, ports including continuous fixed openings of equal size connecting the said channels with said chamber at the upstream side of said apertures through which relatively uniform quantities of hot and cold water are mixed and flow to the common outlet, thermostatic means within said chamber responsive to variations in the average temperature of water flowing therethrough adapted to the operation of said valve and manual means to position said valve in relation to said apertures for initially apportioning the said two streams.

3. In a hot and cold water mixing control, comprising in combination, a sampling chamber, independent hot water and cold water channels on opposite sides thereof, apertures through which said hot and cold water streams flows to a common delivery outlet, said apertures consisting of narrow passages longitudinally arranged in parallel spaced relation, a sliding piston valve having an opening therethrough arranged to control the relative flow of said hot and cold water, ports including continuous fixed openings of equal size connecting said channels with said chamber at the upstream side of said apertures through which hot and cold water of substantially uniform amounts is mixed within said chamber and flows to the common delivery outlet, a thermostat in said chamber responsive to variations in the average temperature therein operatively connected with said valve, and manual operated means for jointly adjusting the position of said thermostat and said valve in relation to said apertures for initially apportioning said two streams.

References Cited in the file of this patent

UNITED STATES PATENTS

| Re. 19,488 | Russell | Mar. 5, 1935 |
| 1,022,188 | Geissinger | Apr. 2, 1912 |
| 1,985,929 | Jorgensen et al. | Jan. 1, 1935 |
| 2,569,838 | Vinson | Oct. 2, 1951 |

FOREIGN PATENTS

| 70,835 | Austria | Jan. 10, 1916 |